Feb. 6, 1951     H. C. HILL     2,540,882
TRUE MOTION CONNECTING ROD STRUCTURE
Filed June 22, 1945     4 Sheets-Sheet 1
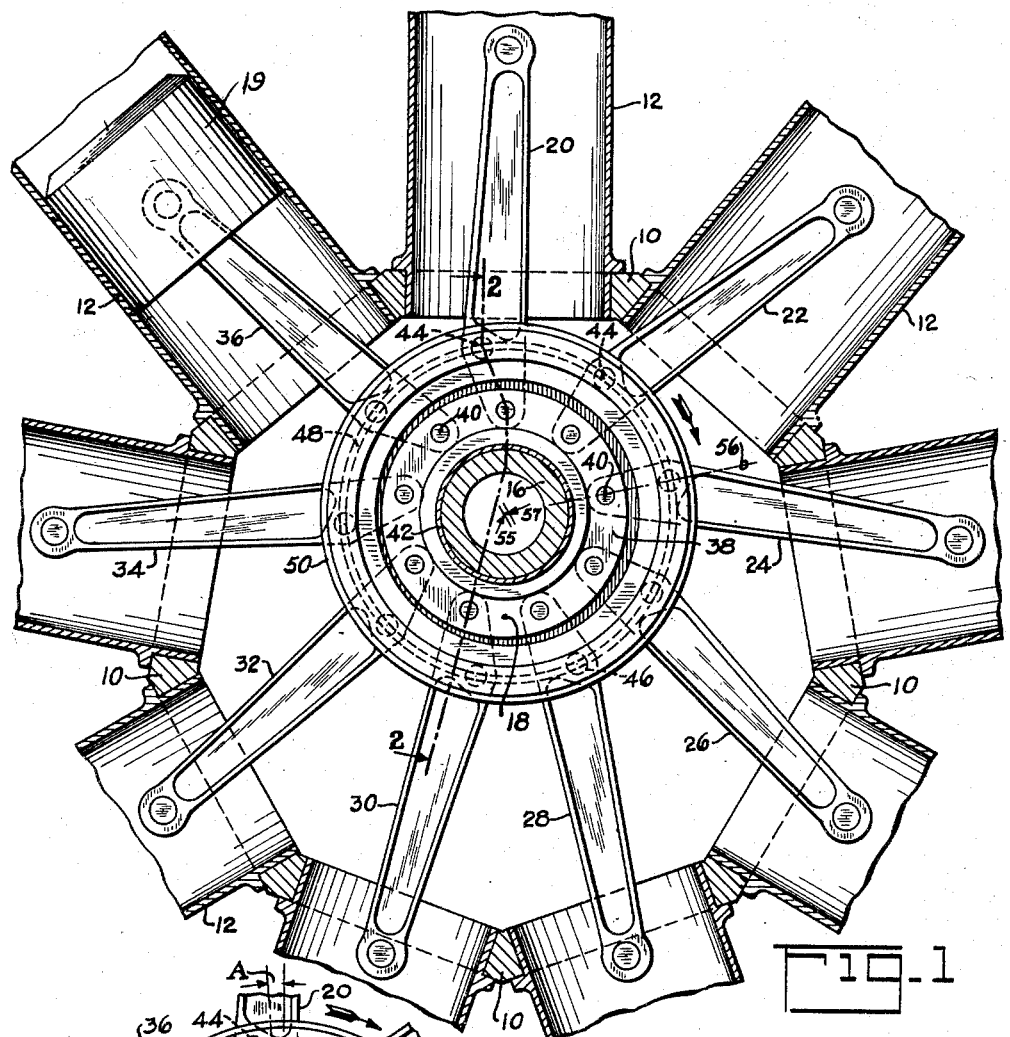
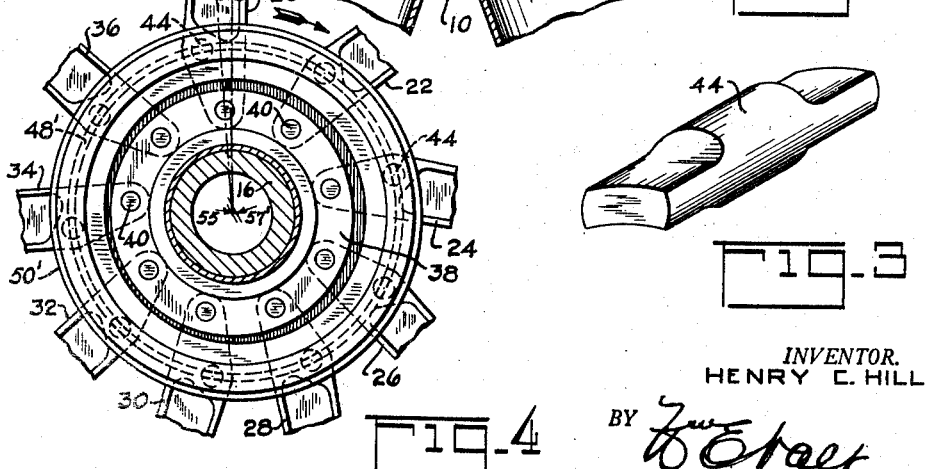
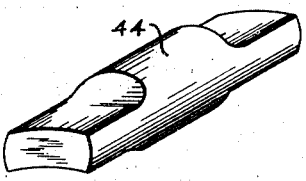
INVENTOR.
HENRY C. HILL.
BY
ATTORNEY Feb. 6, 1951        H. C. HILL        2,540,882
TRUE MOTION CONNECTING ROD STRUCTURE
Filed June 22, 1945        4 Sheets-Sheet 2
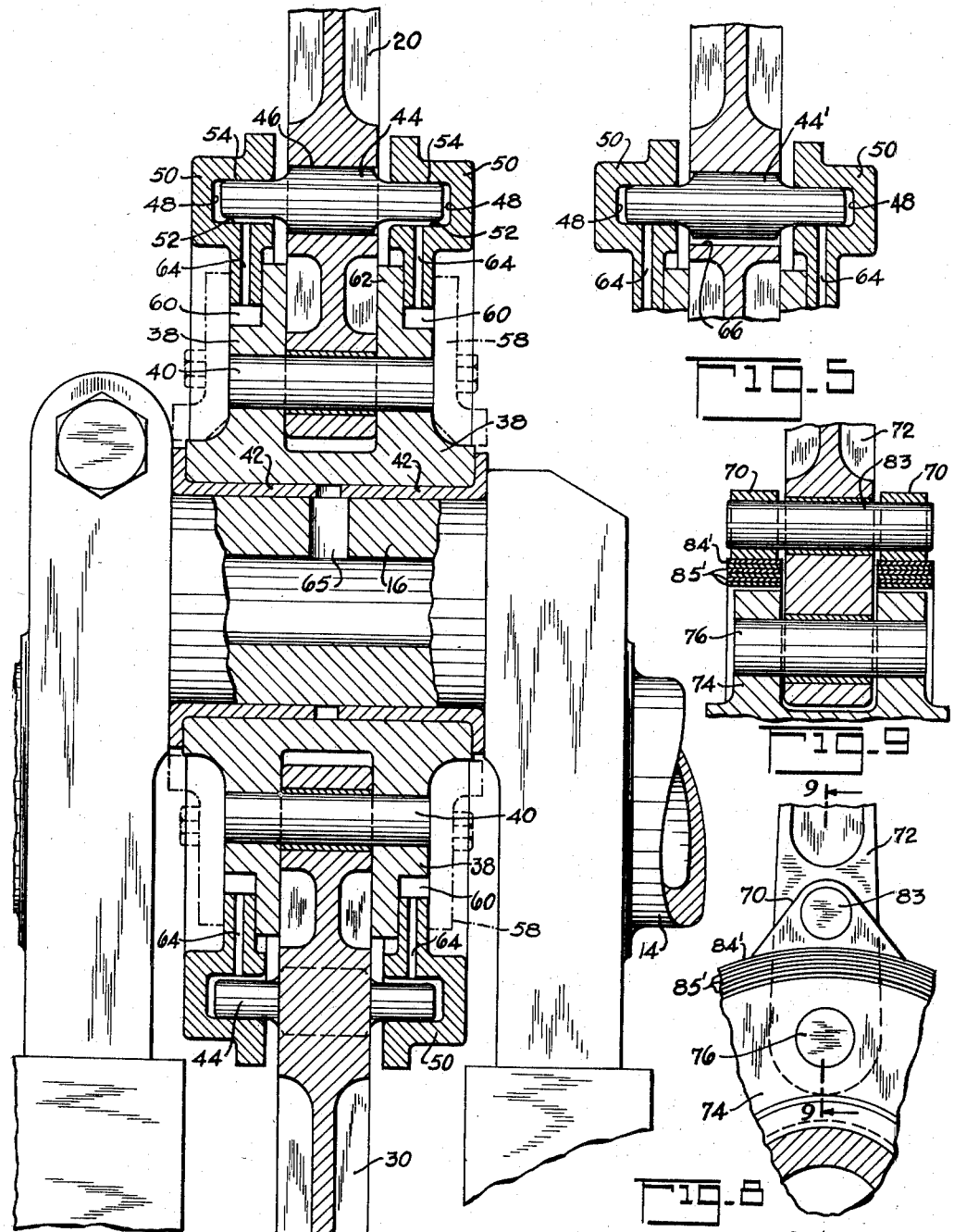
INVENTOR.
HENRY C. HILL
ATTORNEY

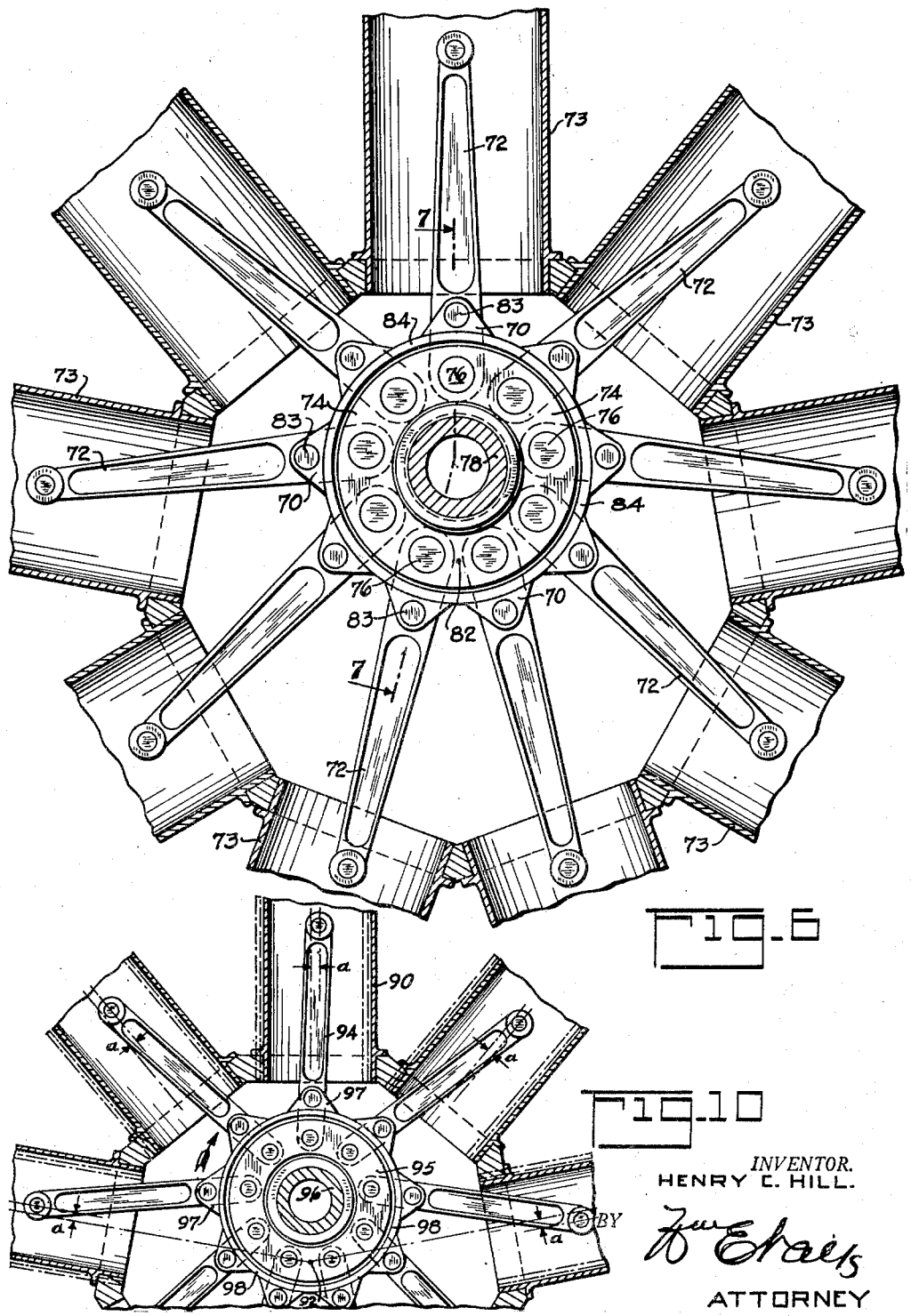

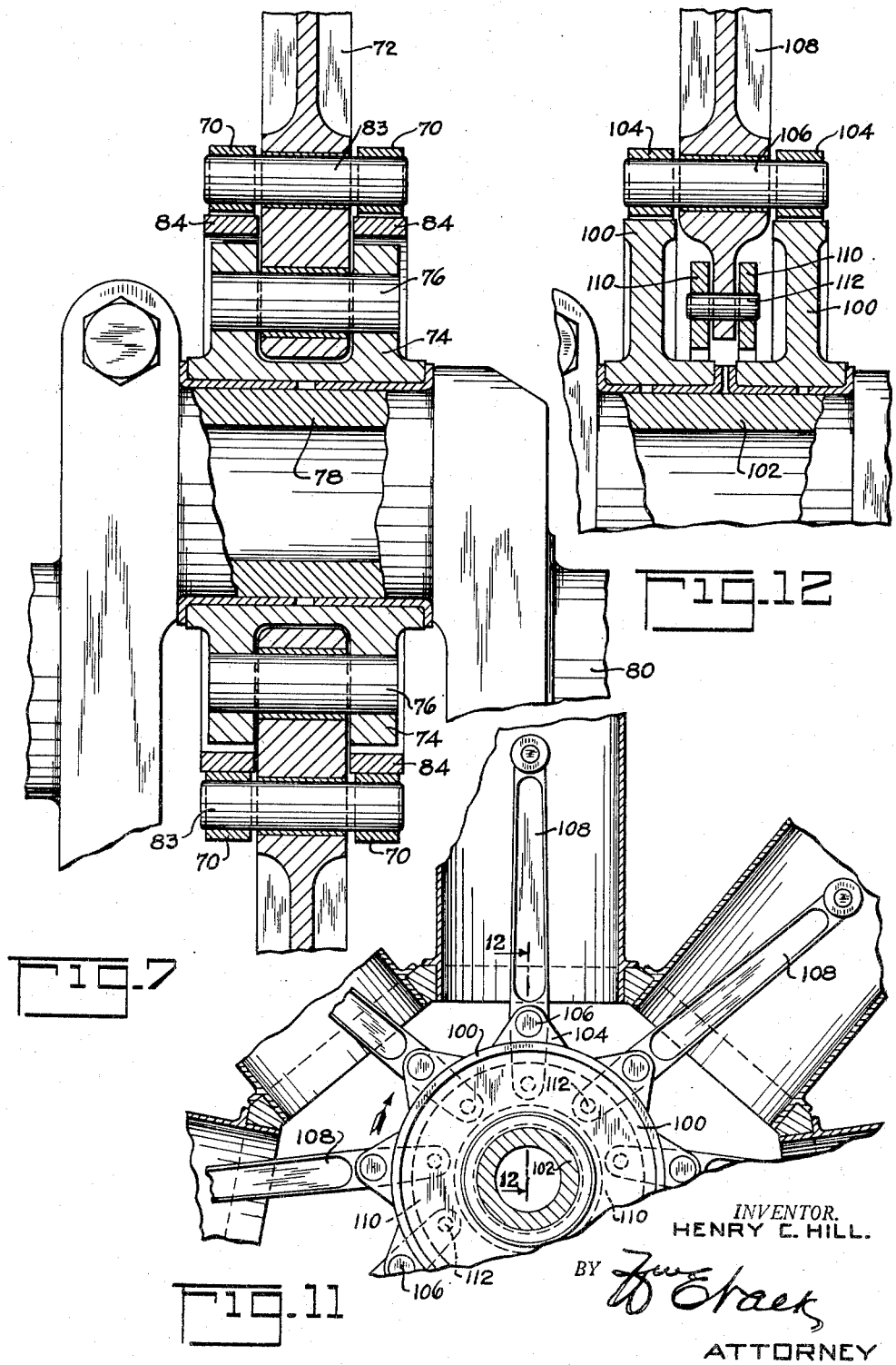

Patented Feb. 6, 1951

2,540,882

UNITED STATES PATENT OFFICE 2,540,882

TRUE MOTION CONNECTING ROD STRUCTURE

Henry C. Hill, Montclair, N. J., assignor to Wright Aeronautical Corporation, a corporation of New York Application June 22, 1945, Serial No. 600,941

14 Claims. (Cl. 74—580)

This invention relates to a connecting rod system for radial cylinder engines or pumps and is particularly directed to such a system in which all the connecting rods have substantially the same motion—that is, to a so-called true motion connecting rod system.

The conventional connecting rod system for a radial cylinder engine comprises a master connecting rod journaled about a crankshaft crankpin together with auxiliary connecting rods journaled about knuckle pins mounted about the hub of the master connecting rod. In such a construction, during engine operation the center of the master rod hub moves in a circular path while the various knuckle pins travel in different elliptical-like paths. As a result, the pistons connected to the auxiliary connecting rods have slight errors in displacement thereby introducing valve timing and ignition spark timing difficulties. In addition, the different motions of the master connecting rod and the auxiliary connecting rods makes it difficult to balance the connecting rod system.

It is an object of this invention to provide a simple and practical connecting rod system in which all the connecting rods have substantially the same motion. Specifically, the invention comprises a hub or spool member journaled about the crankshaft crankpin and to which hub member all the connecting rods are pivotally connected. The motion of this hub member is constrained to a circular motion of translation by means of slippers pivotally mounted on each of the connecting rods and adapted to engage a floating ring. In this way, maximum angularity of the connecting rods relative to the axes of their associated cylinders is limited by engagement of the connecting rod slippers with said floating ring. The slippers may be disposed on the axis of each connecting rod or they may be offset from the axes of their associated connecting rods and in which case the slippers extend within a channel formed in a floating ring. The arrangement is such that the outer circular surface of the channel is engageable by the slippers to restrain the hub, to which the connecting rods are connected, against rotation in one direction about its axis while the inner circular surface of this channel is engageable by the slippers to restrain the hub against rotation in the other direction.

Other objects of this invention will become apparent upon reading the annexed detailed description in connection with the drawing in which:

Figure 1 is a transverse sectional view of a radial cylinder engine and illustrates a connecting rod system embodying the invention;

Figure 2 is a sectional view along line 2—2 of Figure 1;

Figure 3 is a perspective view of a slipper element used in Figures 1 and 2;

Figure 4 is a view of a modified construction of a portion of Figure 1;

Figure 5 is a view of a modification of another portion of Figure 1;

Figure 6 is a view similar to Figure 1 of a modified form of the invention;

Figure 7 is a sectional view taken along line 7—7 of Figure 6;

Figure 8 is a partial view of a modification of Figure 6;

Figure 9 is a sectional view taken along line 9—9 of Figure 8;

Figure 10 is a further modification of Figure 6;

Figure 11 is a view similar to Figure 6 of a further modified form of the invention; and Figure 12 is a sectional view taken along line 12—12 of Figure 11.

Referring first to Figures 1 and 2, a radial cylinder internal combustion engine is provided with a crankcase 10 having a plurality of radially disposed cylinders 12 mounted thereon, and a crankshaft 14 having a crankpin 16 is journaled within said crankcase. The crankshaft axis is indicated at 18 in Figure 1. The pistons 19 disposed in cylinders 12 are provided with connecting rods 20, 22, 24, 26, 28, 30, 32, 34 and 36, each of which are pivotally connected to a hub member 38 by knuckle pins 40. Only one piston 19 has been illustrated but obviously each connecting rod is provided with a similar piston. The hub member 38 is journaled about the crankpin 16 and bushings 42 are disposed therebetween.

In order to restrain the hub member 38 against rotation about the axis of the crankpin 16, each connecting rod is provided with a slipper member 44 journaled within openings 46 within the connecting rod and offset from the axis of the connecting rod. Each of the slippers 44 is received within an annular channel 48 provided by an annular member or ring 50. Except for its engagement with the connecting rod slippers, each ring member 50 is free to assume any position relative to the axis of the crankpin. The channel 48 provides an inner circular track 52 and an outer circular track 54 and the ends of the slippers extending into channel 48 are provided with a curvature corresponding to the curvature of the adjacent tracks. Only one ring 50 is required but preferably two such rings 50 are provided, one on each side of the connecting rods, in order to prevent eccentric loading of the connecting rods by the slippers. Accordingly, both ends of the slippers are formed for reception within channels 48. The construction of the slippers 44 is best seen in the perspective view of Figure 3.

With this construction and with clockwise rotation of the crankshaft, as indicated by the arrow in Figure 1, maximum angularity of the connecting rods is limited by engagement of the slippers with the inner circular surface or track 52 of the channel 48. Thus, in the crankshaft position, illustrated in Figure 1, connecting rods 24 and 34 are at maximum angularity and the slippers 44 of these connecting rods both bear tightly against the inner track 52 of the channel 48. Also, with the crankshaft at the top dead center position for connecting rod 20, as illustrated in Figure 1, the direction of the offset of the slippers 44 from the longitudinal axes of their associated connecting rods will result in the slipper of connecting rod 34 being displaced somewhat closer to the center 55 of the crankpin 16 than the slipper of connecting rod 24. Accordingly, the center 57 of the floating rings 50 will be displaced somewhat to the right of the crankpin center 55 as viewed in Figure 1.

There may also be some contact pressure on the slippers of the adjacent connecting rods particularly when two adjacent connecting rods are close to their maximum angularity relative to the axes of their associated cylinders. As to the remaining connecting rod slippers, there is a small clearance between them and the inner track 52. It should be observed that the clearance between the slippers and the inner track 52 is a maximum for the connecting rods whose pistons are at the top or bottom dead center positions. Therefore, the heavy explosion loads occurring at the top dead center position of each piston are not carried by the slippers but are transmitted directly to the hub member 38 through the knuckle pins 40.

It is not possible for all the slippers to engage either the inner track 52 or the outer track 54 since, as a result of the different angular positions of the connecting rods at any one time, the slippers do not lie on a common circle. The clearance between the slipper of rod 20 and the inner track 52 is illustrated in Figure 2, but the magnitude of this clearance is too small for illustration in Figure 1, and this clearance can be eliminated by making the ring 50 and its channel 48 flexible, whereupon in the crankshaft position illustrated in Figure 1, the pressure against the inner track 52 from the slippers on the connecting rods 24 and 34, i. e. the connecting rods 90° ahead and 90° behind the top dead center connecting rod, would distort the ring 50 to an oval shape thereby bringing the other slippers into contact with the inner track 52.

Each pair of inner and outer tracks 52 and 54 respectively, instead of being provided on a single floating ring 50 may be provided by two floating rings, the one providing the inner track and the other the outer track. This latter construction is particularly desirable if the tracks are to be made flexible so as to engage all the slippers.

The slippers of the connecting rods nearest the top and bottom dead center positions of their associated pistons engage the outer track 54. If the engine torque should reverse, for example when the engine backfires, the hub member 38 will tend to rotate counterclockwise. As a result, under reverse torque conditions, the slippers tend to move outwardly relative to the annular channel 48 and this tendency is resisted by engagement with the track 54 of the slippers on the connecting rods for the pistons nearest their top and bottom dead center positions, thereby preventing rotation of the hub member about its axis.

Preferably, the magnitude of the offset of the slippers from the axis of their associated connecting rods at least should be substantially large enough so that when a particular connecting rod is at its largest angularity relative to the axis of the cylinder and in a direction opposite to the direction of crank shaft rotation, the center of its slipper is approximately on a line through its associated knuckle pin and the axis of the crankpin. Thus, as illustrated in Figure 1, the rod 24 is at its maximum angularity and a line 56 through the crankpin axis and the center of the associated knuckle pin passes through the center of the slipper. If the offset from the slippers is made much smaller than this maximum connecting rod angularity, then the connecting rod system tends to be unstable under reverse torque conditions—that is, when the engine backfires. The magnitude of the slipper offset may be increased beyond that illustrated in Figure 1—that is, beyond the maximum angularity of the connecting rods. Increasing the magnitude of this offset has the advantage of decreasing the contact pressures on the slippers but has the disadvantage that the width and therefore the weight of the connecting rods becomes larger.

The floating annular ring members 50 may be held against axial movement away from the connecting rods and their slippers by locking plates 58 secured to the hub member 38. These locking plates 58 have been illustrated by dashed lines in Figure 2 and for reasons of clarity have been omitted from Figure 1. Lubricating oil may be supplied to the slippers 44 from the crankpin bushings 42 to each of the annular spaces 60 defined by a ring member 50, locking plate 58 and an annular flange 62 on the hub member 38. For example, as illustrated in Figure 7 of my prior patent No. 2,239,039, lubricating oil is supplied to hollow connecting rod knuckle pins from an end of the crank pin bushing. In the present application the knuckle pins 40 may be made hollow and lubricated in a manner similar to that disclosed in said patent, and from the hollow interior of the knuckle pins lubricating oil may be readily supplied to the annular spaces 60. The ring member 50 may be provided with suitable holes 64 for conveying the lubricating oil from the annular spaces 60 into the annular channels 48. The crankpin bushings 42 are lubricated through openings 65 in the crankpin by means of lubricating oil supplied to the center of the crankpin as is conventional practice.

With the aforedescribed construction, each connecting rod slipper 44 is offset from the longitudinal axis of its associated connecting rod in a direction opposite to the direction of rotation of its connecting rod as said connecting rod passes through its top dead center position. As a result, any tendency of the hub member 38 to rotate clockwise about the crankpin axis, as viewed in Figure 1, is resisted by a relative inward movement of the slippers against the inner track 52 and any tendency of the hub member 38 to rotate counterclockwise is resisted by a relative outward movement of the slippers against the outer track 54.

At this point, it should be noted that it is also within the scope of this invention to offset the slippers on the other side of the longitudinal axes of their associated connecting rods relative to the direction of rotation of the crankshaft. However, this latter offset arrangement results in an increase in the maximum slipper contact loads as compared to the offset arrangement illustrated.

It has also been found that the slipper loads may be decreased by angularly offsetting the hub member 38, as illustrated in Figure 4. As there illustrated, the crankshaft rotates in a clockwise direction as in Figure 1, but the hub member 38 is provided with a counterclockwise angular displacement as compared to its symmetrical position in Figure 1 and as indicated by the angle "A" in Figure 4. That is, in Figure 4 when the crankshaft is in the top dead center position for the piston of connecting rod 20, the associated knuckle pin 40 is angularly offset in a counterclockwise direction by the angle "A." As mentioned in connection with Figures 1 and 2, counterclockwise rotation of the hub member 38 causes the slippers to move outwardly relative to the ring member 52. Accordingly, angular counterclockwise displacement of the hub member equal to the angle "A" can be obtained by providing a ring or rings 50' each with a channel 48' having a diameter somewhat larger than that of the channels 48 of rings 50. However, if the angle "A" is made too large by too large an increase in the diameter of channel 48', the engine crankshaft will be subjected to periodic negative torque, that is to periodic torque against the normal direction of crankshaft rotation. Thus, the angle "A" should be kept small and its optimum value will depend, for example, on the connecting rod length, stroke of the engine and the disposition of the knuckle pins relative to the crankpin axis. For example, in an engine having a connecting rod length of approximately 11" and a stroke of 6" or 7", and in which the knuckle pins are approximately 3" from the crankpin axis, the angle "A" should be less than 5° and preferably is between 2° and 3°. In Figure 4, the centers of the crankpin and rings 50 are indicated at 55 and 57' respectively.

Figure 5 illustrates a modification in which the clearance between the slippers and the inner and outer tracks of the channel 48 in the ring member 50 is provided by the loose fit between each of the slippers 44' and a hole 66 through the associated connecting rod, the slippers 44' extending through said holes 66.

In the species of Figures 1 and 2, the connecting rod slippers are offset from the axes of their associated connecting rods. However, as illustrated in Figures 6 and 7, the slippers may be disposed on the axes of their associated connecting rods. The species of Figures 6 and 7 is otherwise similar to the construction of Figures 1 and 2. In Figures 6 and 7, slippers 70 are pivoted on the longitudinal axes of their associated connecting rods 72, that is on a line passing through the pivot axes at the ends of the connecting rods. Each of the connecting rods 72 are pivotally connected at their outer ends to pistons (similar to the pistons 19 of Figure 1) disposed in cylinders 73 and pivotally connected at their inner ends to a hub member 74 by means of knuckle pins 76 and the hub member 74 is journaled about a crankpin 78 on a crankshaft 80 having an axis 82. The slippers 70 are secured to the ends of the pins 83, which, in turn, are journaled within suitable openings in the connecting rods. A floating ring 84 is disposed on each side of the connecting rods for engagement by a correspondingly curved inner surface on each of the slippers 70. As in Figures 1 to 5, two floating rings preferably are provided, one on each side of the connecting rods in order to prevent eccentric loading of the connecting rods.

The engagement of the slippers 70 with the floating rings 84 limits the angular motion of the connecting rods thereby preventing rotation of the hub member 74 about the axis of the crankpin. Thus, the operation of Figures 6 and 7 is quite similar to that of Figures 1 and 2. However, the offset construction of Figures 1 and 2 reduces the slipper contact pressures. The floating rings 84 may be held axially in position by locking plates similar to the locking plates 53 of Figures 1 and 2. In Figures 6 and 7, no outer slipper track is necessary since rotation of the hub member 74 in either direction about the axis of the crankpin 78 results in the slippers 70 moving inwardly with respect to the floating rings 84. In the modification of Figures 1 and 2, there would be considerable angular backlash—i. e. angular motion of the hub member 38—between normal and reverse engine torques without an outer track for the slippers, but by adding the outer track 54, the magnitude of this backlash can be controlled and reduced to a minimum. However, as compared to the modification of Figures 1 and 2, the modification of Figures 6 and 7 is simpler and more rugged because of the symmetrical arrangement of the connecting rod slippers on the connecting rods.

As noted in connection with Figures 1 and 2, the floating ring may be made flexible to take up all the clearance between the slippers and the rings, thereby distributing the slipper loads among all the slippers. Similarly, the floating rings 84 of Figures 6 and 7 may also be made flexible in order to more uniformly distribute the slipper loads and also to reduce the aforementioned angular backlash of the connecting rod hub member between normal and reverse engine torques. In order to distribute the slipper loads between all the slippers and to reduce the backlash in Figures 6 and 7, the floating rings must be made quite flexible and yet must be strong enough to withstand the local slipper pressure. Thus, the ring 84 of Figures 6 and 7 may be modified as illustrated at 84' in Figures 8 and 9. Each floating ring 84' comprises a plurality of nested concentric rings 85' thereby providing a laminated floating ring. The modification of Figures 8 and 9 is otherwise similar to Figures 6 and 7 and like parts have been indicated by like reference numerals. With this construction of Figures 8 and 9, the rings 84' each act as a laminated leaf spring as to bending between the slippers 70. Accordingly, the laminated floating rings 84' can be made relatively flexible and yet sufficiently strong to withstand local slipper contact pressures. The laminated floating rings 84' preferably should have a free external diameter slightly less than the diameter of the slipper contact circle when all the connecting rods are radial to the crankpin, that is—before assembly. Upon assembly, the connecting rods deflected from their mid positions will apply pressure through their slippers to the laminated floating rings 84' to give each of these rings an oval shape, thereby pressing the rings against the slippers on the connecting rods occupying the top and bottom dead center positions. In this way, by selecting the outside diameter of the flexible floating rings 84', the connecting rods at the top and bottom dead center positions can also be pre-loaded through their slippers, and any tendency of the connecting rod hub 74 to rotate about its axis is resisted by all the slippers, thereby decreasing the maximum slipper loads. Obviously, this laminated spring type of floating ring may also be used in the modifications of Figures 1 to 5 by replacing each floating ring 50, with its respective inner and outer tracks 52 and 54, by separate inner and outer floating rings each similar to the laminated spring type ring 84' and respectively providing the inner and outer tracks.

With the slippers on the longitudinal axes of their associated connecting rods, as in Figures 6 to 9, it is not possible to offset the connecting rod hub member by controlling the diameter of the floating track as in Figure 4 in order to reduce the slipper loads. However, substantially the same result can be accomplished in the modification of Figures 6 and 7 by offsetting the axes of the cylinders parallel to their usual symmetrical or radial disposition relative to the axis of the crankshaft. This modification is illustrated in Figure 10 in which the axes of the cylinders 90 are displaced a small distance $a$ in the direction of the crankshaft rotation from their usual disposition passing through the axis 92 of the crankshaft, a piston similar to the piston 19 of Figure 1 being slidable in each cylinder 90. The usual or conventional disposition of the cylinders radial relative to the crankshaft axis is illustrated by dashed lines in Figure 10. In this way, as in Figure 4, when the crankshaft is in the top dead center position for a given piston, the connecting rod 94 for this piston is angularly offset from the axis of its cylinder. The modification of Figure 10 is otherwise similar to that of Figures 6 and 7 or that of Figures 8 and 9. Thus, each connecting rod 94 is pivotally connected to a hub member 95 journaled about a crankpin 96 and slippers 97, pivotally carried by the connecting rods, are disposed for engagement by a floating ring 98. Because of the offset $a$ each floating ring 98 is offset slightly from the axis of the crankpin. The magnitude of this latter offset is too small to illustrate on the drawing.

It is also possible in effect to reverse the slippers and knuckle pins so that the knuckle pins instead of the slippers engage the floating rings; for example, as illustrated in Figures 11 and 12. As there illustrated, a pair of hub members 100 are journaled about a crankpin 102 and each hub member provides a track engageable by slippers 104 mounted on pins 106 journaled on the connecting rods 108. Pistons (not illustrated in Figure 11) similar to the pistons 19 of Figure 1 are pivotally connected to the outer ends of the connecting rods. Angular movement of the connecting rods is limited by a pair of floating rings 110 disposed on opposite sides of inwardly directed extensions of the connecting rods 108. The rings 110 are connected to the connecting rods by pins 112 journaled within holes in said rings and connecting rods. In this modification, as in the previous modifications, there is a small amount of clearance between the slippers and the tracks engaged thereby.

With this construction, the modification illustrated by Figures 11 and 12 in effect is similar to that of Figures 6 to 9 except in Figures 11 and 12, the knuckle pins engage the floating rings while in Figures 6 to 9, the slippers engage the floating rings. Figures 1 to 5 may be similarly modified by having the knuckle pins instead of the slippers engage the floating rings. In addition, in all the modifications the slippers have been pivotally mounted on the connecting rods radially outward from the connecting rod knuckle pins. Obviously, however, in all the modifications, the slippers may be disposed radially inward instead of radially outward of the knuckle pins.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. A connecting rod assembly for a crankshaft crankpin, said assembly comprising an annular member journaled about said crankpin, a floating ring member, one of said members having an annular surface, a plurality of connecting rods, a slipper element and a knuckle pin for each connecting rod, said slipper elements being engageable with said annular surface on said one member and said knuckle pins being carried by the other of said members, said ring member comprising a series of concentric laminations.

2. A connecting rod assembly for a crankshaft crankpin, said assembly comprising an annular member journaled about said crankpin, a plurality of connecting rods pivotally connected to said member, and means for restraining said member against rotation about the axis of said crankpin, said means comprising floating means providing radially inner and outer annular tracks, and a plurality of members each pivotally connected to a different one of said connecting rods and being engageable with said tracks.

3. A connecting rod assembly for a crankshaft crankpin, said assembly comprising an annular member journaled about said crankpin, a plurality of connecting rods pivotally connected to said member, and means for restraining said member against rotation about the axis of said crankpin, said means comprising floating means providing radially inner and outer annular tracks, and a plurality of members each pivotally connected to a different one of said connecting rods and being engageable with said tracks, said pivotal connection of each of said plurality of members to its associated connecting rod being offset from the longitudinal axis of said connecting rod.

4. A connecting rod assembly for a crankshaft crankpin, said assembly comprising an annular member journaled about said crankpin, a plurality of connecting rods pivotally connected to said member, and means for restraining said member against rotation about the axis of said crankpin, said means comprising floating means providing radially inner and outer annular tracks, and a plurality of members each pivotally connected to a different one of said connecting rods and being engageable with said tracks, each of said plurality of members comprising a shaft-like member journaled in a hole in its associated connecting rod and extending therefrom for engagement with said tracks.

5. A connecting rod assembly for a crankshaft crankpin, said assembly comprising an annular member journaled about said crankpin, a plurality of connecting rods pivotally connected to said member, and means for restraining said member against rotation about the axis of said crankpin, said means comprising floating means providing integral radially inner and outer annular tracks, and a plurality of members each pivotally connected to a different one of said connecting rods and being engageable with said tracks.

6. A connecting rod assembly for a crankshaft crankpin, said assembly comprising an annular member journaled about said crankpin, a plurality of connecting rods pivotally connected to said member, and means for restraining said member against rotation about the axis of said crankpin, said means comprising an integral floating ring member having an annular channel, and a plurality of members each pivotally connected to a different one of said connecting rods and extending into said channel for engagement with the radially inner and outer concentric surfaces of said channel.

7. A connecting rod assembly for a crankshaft crankpin, said assembly comprising an annular member journaled about said crankpin, a plurality of connecting rods pivotally connected to said member, and means for restraining said member against rotation about the axis of said crankpin, said means comprising a plurality of members each respectively pivotally connected to and on the longitudinal axis of one of said connecting rods, and a floating ring having an annular surface slidably engageable by each of said plurality of members.

8. A connecting rod assembly for a crankshaft crankpin, said assembly comprising an annular member journaled about said crankpin, a plurality of connecting rods pivotally connected to said member, and means for restraining said member against rotation about the axis of said crankpin, said means comprising a plurality of members each respectively pivotally connected to and on the longitudinal axis of one of said connecting rods, and a floating ring having an annular surface slidably engageable by each of said plurality of members, said ring comprising a series of concentric laminations.

9. A connecting rod assembly for a crankshaft crankpin, said assembly comprising an annular member journaled about said crankpin, a plurality of connecting rods pivotally connected to said member, and means for restraining said member against rotation about the axis of said crankpin, a floating ring, having an annular surface, and a plurality of members each respectively pivotally connected to one of said connecting rods with its pivot axis passing through the longitudinal axis of its associated connecting rod, each of said members being engageable with said annular surface on said ring.

10. A connecting rod assembly between a plurality of pistons and a crankshaft crankpin, said assembly comprising an annular member journaled about said crankpin, a plurality of connecting rods pivotally connected to said member at their inner ends and pivotally connected to said pistons at their outer ends, the axis of each piston being parallel to, and offset from, a line directed radially from the axis of said crankshaft, and means for restraining said member against rotation about the axis of said crankpin, said means comprising a plurality of members each respectively pivotally connected to, and on the longitudinal axis of, one of said connecting rods, and a floating ring engageable by each of said plurality of members.

11. A connecting rod assembly between a plurality of pistons and a crankshaft crankpin, said assembly comprising an annular member journaled about said crankpin, a plurality of connecting rods pivotally connected to said member at their inner ends and pivotally connected to said pistons at their outer ends, the axis of each piston being parallel to, and offset from, a line directed radially from the axis of said crankshaft, and means for restraining said member against rotation about the axis of said crankpin, said means comprising a plurality of members each respectively pivotally connected to, and on the longitudinal axis of, one of said connecting rods, and a floating ring engageable by each of said plurality of members, the direction of said offset being such that the top dead center position of each piston lags behind the crankpin.

12. A connecting rod assembly for a crankshaft crankpin, said assembly comprising an annular member journaled about said crankpin, a floating ring member, a plurality of connecting rods each pivotally connected to said ring member, and a plurality of slipper elements each respectively pivotally connected to one of said connecting rods and engageable with said annular member.

13. A connecting rod assembly for a crankshaft having a crankpin, said assembly comprising an annular member journaled about said crankpin, a plurality of connecting rods pivotally connected to said member, and means for restraining said member against rotation about the axis of said crankpin, said restraining means comprising floating means providing radially inner and outer annular tracks, and a plurality of members each pivotally connected to a different one of said connecting rods about an axis offset from the longitudinal axis of its associated connecting rod and each being engageble with said tracks, the diameter of said tracks being such that said annular member is angularly displaced from a symmetrical position in which, during crankshaft operation, the longitudinal axis of each connecting rod would be periodically disposed in a plane defined by the axes of said crankshaft and crankpin.

14. A connecting rod assembly for a crankshaft having a crankpin, said assembly comprising an annual member journaled about said crankpin, a plurality of connecting rods pivotally connected to said member, and means for restraining said member against rotation about the axis of said crankpin, said restraining means comprising floating means providing radially inner and outer annular tracks, and a plurality of members each pivotally connected to a different one of said connecting rods about an axis offset from the longitudinal axis of its associated connecting rod in a direction opposite to the direction of rotation of said connecting rod as it passes through its top dead center position, each of said plurality of members being engageable with said tracks, the diameter of said tracks being such that said annular member is angularly displaced from a symmetrical position in which, during crankshaft operation, the longitudinal axis of each connecting rod would be periodically disposed in a plane defined by the axes of said crankshaft and crankpin, the angular displacement of said annular member being in the same direction relative to crankshaft rotation as said offset of the pivotal connection of each of said plurality of members.

HENRY C. HILL.

REFERENCES CITED

The following references are of record in the file of this patent:

UNITED STATES PATENTS

| Number | Name | Date |
| --- | --- | --- |
| 2,199,655 | Sollinger | May 7, 1940 |
| 2,239,039 | Hill | Apr. 22, 1941 |
| 2,390,623 | Steiner | Dec. 11, 1945 |

FOREIGN PATENTS

| Number | Country | Date |
| --- | --- | --- |
| 511,946 | France | Jan. 7, 1921 |